(12) United States Patent
Tachiiri et al.

(10) Patent No.: US 12,051,345 B2
(45) Date of Patent: Jul. 30, 2024

(54) VEHICULAR DISPLAY CONTROL DEVICE

(71) Applicant: DENSO CORPORATION, Kariya (JP)

(72) Inventors: Motoki Tachiiri, Nisshin (JP); Daisuke Takemori, Kariya (JP)

(73) Assignee: DENSO CORPORATION, Kariya (JP)

( * ) Notice: Subject to any disclaimer, the term of this patent is extended or adjusted under 35 U.S.C. 154(b) by 179 days.

(21) Appl. No.: 17/734,969

(22) Filed: May 2, 2022

(65) Prior Publication Data

US 2022/0270527 A1    Aug. 25, 2022

Related U.S. Application Data

(63) Continuation of application No. PCT/JP2020/041081, filed on Nov. 2, 2020.

(30) Foreign Application Priority Data

Nov. 11, 2019  (JP) ................................. 2019-203975

(51) Int. Cl.
| | |
|---|---|
| *G09G 3/00* | (2006.01) |
| *B60K 35/00* | (2024.01) |
| *B60K 35/23* | (2024.01) |
| *B60K 35/28* | (2024.01) |
| *B60K 35/81* | (2024.01) |

(52) U.S. Cl.
CPC ............ *G09G 3/002* (2013.01); *B60K 35/00* (2013.01); *B60K 35/23* (2024.01); *B60K 35/28* (2024.01); *B60K 35/81* (2024.01); *B60K 2360/166* (2024.01); *B60K 2360/167* (2024.01); *G09G 2340/0464* (2013.01); *G09G 2354/00* (2013.01); *G09G 2380/10* (2013.01)

(58) Field of Classification Search
None
See application file for complete search history.

(56) References Cited

U.S. PATENT DOCUMENTS

| | | | |
|---|---|---|---|
| 11,112,604 B2* | 9/2021 | Stamm | G02B 27/0101 |
| 2010/0066832 A1* | 3/2010 | Nagahara | G02B 27/01 |
| | | | 348/148 |
| 2014/0379260 A1* | 12/2014 | Maihoefer | G02B 27/01 |
| | | | 701/538 |
| 2018/0101010 A1* | 4/2018 | Nill | G02B 27/646 |
| 2019/0025580 A1* | 1/2019 | Nagano | G02B 27/01 |
| 2019/0139286 A1 | 5/2019 | Shimoda et al. | |
| 2020/0103649 A1* | 4/2020 | Higashiyama | G03B 21/2066 |
| 2020/0326538 A1* | 10/2020 | Stamm | G02B 27/0093 |
| 2021/0185232 A1* | 6/2021 | Sdobnikov | G06V 20/20 |
| 2022/0270527 A1* | 8/2022 | Tachiiri | G09G 5/38 |

FOREIGN PATENT DOCUMENTS

| | | |
|---|---|---|
| JP | 2021020625 A | 2/2021 |
| JP | 2021020626 A | 2/2021 |
| WO | WO-2018042898 A1 | 3/2018 |

* cited by examiner

*Primary Examiner* — Jason A Pringle-Parker
(74) *Attorney, Agent, or Firm* — Harness, Dickey & Pierce, P.L.C.

(57) ABSTRACT

A display control device sets a display position of an image to be recognized by a driver of a vehicle as a virtual image such that the image is superimposed on a scenery in front of the vehicle. The display control device calculates a correction amount for correcting the display position at which the image is superimposed on the scenery.

4 Claims, 8 Drawing Sheets

VEHICULAR DISPLAY CONTROL DEVICE

CROSS REFERENCE TO RELATED APPLICATIONS

The present application is a continuation application of International Patent Application No. PCT/JP2020/041081 filed on Nov. 2, 2020, which designated the U.S. and claims the benefit of priority from Japanese Patent Application No. 2019-203975 filed on Nov. 11, 2019. The entire disclosures of all of the above applications are incorporated herein by reference.

TECHNICAL FIELD

The present disclosure relates to a display control device that controls an in-vehicle display or the like.

BACKGROUND

As a device that superimposes a virtual image on an object in a scenery that can be seen through a windshield of a vehicle, a head-up display having an Augmented Reality (AR) function (hereinafter referred to as an AR-HUD) is known.

SUMMARY

The present disclosure provides a display control device. The display control device sets a display position of an image to be recognized by a driver of a vehicle as a virtual image such that the image is superimposed on a scenery in front of the vehicle. The display control device calculates a correction amount for correcting the display position at which the image is superimposed on the scenery.

BRIEF DESCRIPTION OF DRAWINGS

The features and advantages of the present disclosure will become more apparent from the following detailed description made with reference to the accompanying drawings. In the drawings.

DETAILED DESCRIPTION

Figure 1:
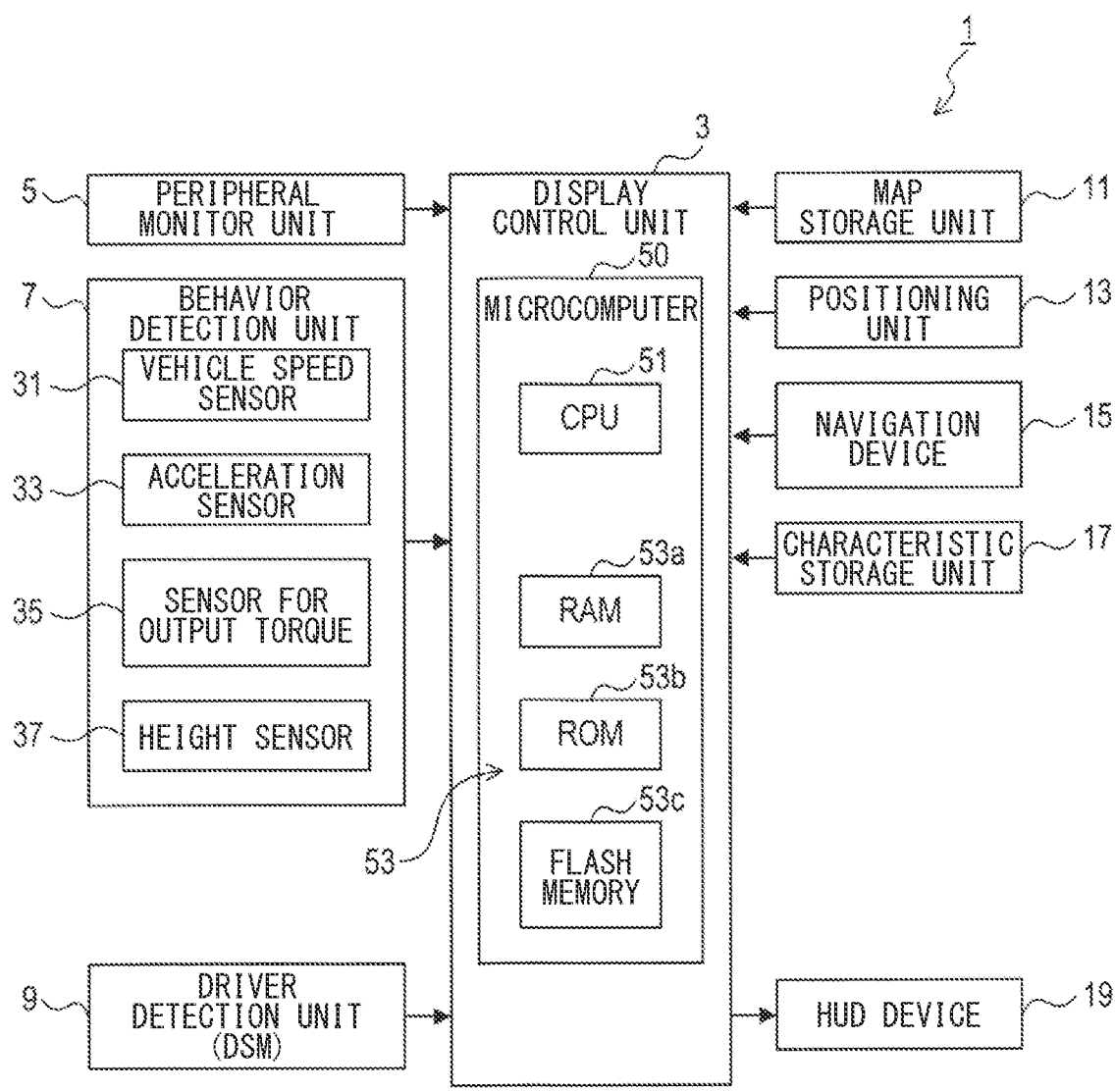
FIG. 1 is a block diagram showing a configuration of an information display system.

In an AR-HUD, there is a difficulty that a superimposed position of a virtual image in a scenery shifts due to a change in a pitch angle or a roll angle of a vehicle.

As a countermeasure, the pitch angle or roll angle may be detected by an angular sensor, a vehicle posture may be estimated based on the detected angle, and an angle of a mirror that projects an image and a display position may be adjusted. Thereby, a misalignment of the virtual image may be suppressed.

As a result of detailed examination by the inventors, the following difficulty was found.

For example, a vehicle posture (for example, a pitch angle) is estimated according to an output value (that is, a sensor value) of a pitch angle sensor, and then the display position is corrected. However, in a traveling state, the sensor value often changes quickly. In such a case, in the above conventional technique, the display position also changes quickly, so that the display of the virtual image may be flickering and difficult to see.

As a countermeasure, it is conceivable to apply a low-pass filter (that is, LPF) to a sensor value to slowly change the sensor value. However, in this case, the followability when correcting the display position is lowered. Therefore, the state in which the superimposed position of the virtual image is displaced becomes long, and there is a possibility that recognition of a displayed content is deteriorated, particularly in a traveling state.

As described above, it has been found that it is not easy to achieve both suppression of display flicker on an in-vehicle display and quick correction of display position.

The present disclosure provides a display control device capable of suppressing display flicker on an in-vehicle display or the like and quickly correcting a display position.

An exemplary embodiment of the present disclosure provides a display control device. The display control device includes an information generation unit, a traveling state acquisition unit, a posture value acquisition unit, a characteristic acquisition unit, a filter processing unit, and a display position correction unit. The information generation unit is configured to set a display position of an image, as a virtual image, to be recognized by a driver of a vehicle such that the image is superimposed on a scenery in front of the vehicle. The image being displayed on a display unit that is disposed in front of a driver seat of the vehicle and enables the driver to recognize the scenery. The traveling state acquisition unit is configured to acquire a traveling state of the vehicle. The posture value acquisition unit is configured to acquire a vehicle posture value indicating a posture of the vehicle. The characteristic acquisition unit is configured to acquire a vehicle characteristic value indicating a characteristic of the vehicle from a characteristic storage unit that stores the vehicle characteristic value. The filter processing unit is configured to perform a filter processing with a filter on the vehicle posture value acquired by the posture value acquisition unit. The display position correction unit is configured to calculate a correction amount for correcting the display position at which the image is superimposed on the scenery based on the vehicle characteristic value processed by the filter processing unit and the vehicle characteristic value acquired by the characteristic acquisition unit. The filter processing unit sets a characteristic of the filter according to the traveling state of the vehicle acquired by the traveling state acquisition unit, and performs the filter processing with the set filter.

In the exemplary embodiment of the present disclosure, when the correction amount of the display position is calculated and the display position is corrected based on the vehicle posture value processed by the filter processing unit and the vehicle characteristic value, the vehicle posture value, in which the filter processing is performed with the filter set according to the traveling state of the vehicle. That is, when the display position is corrected, the vehicle posture value appropriately filtered according to the traveling state of the vehicle can be used.

Therefore, when the image to be recognized as a virtual image on the display unit is superimposed on the scenery, the configuration can suppress display flicker and quickly correct the display position. That is, the configuration can suppress flickering of the display on the in-vehicle display or the like and quickly correct the display position.

For example, when the vehicle is in the acceleration state, a filter having a large time constant is adopted as compared with the case where the vehicle is in the stopped state or the constant speed traveling state. Thus, the configuration, in the acceleration state, can suppress the flickering of the display, and the configuration, in the stopped state or the like, can quickly correct the display position.

Hereinafter, exemplary embodiments for implementing the present disclosure will be described with reference to the drawings.

[1. Embodiment]
[1-1. Overall Configuration]

First, the overall configuration of an information display system including a display control device of the present embodiment will be described.

Figure 2:
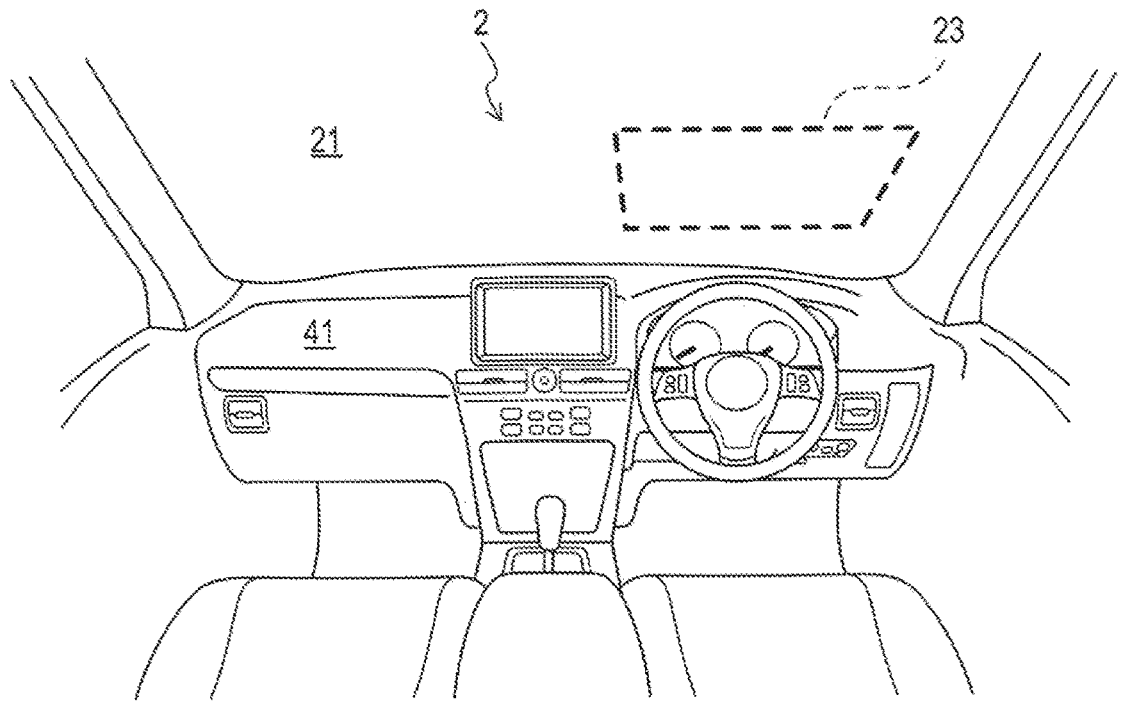
FIG. 2 is an explanatory diagram showing a projection area.

As shown in FIG. 1, the information display system 1 is mounted on, for example, a vehicle 2 shown in FIG. 2. Hereinafter, the vehicle 2 equipped with the information display system 1 may be referred to as a subject vehicle 2.

The information display system 1 includes a display control device 3. Further, the information display system 1 may include a peripheral monitoring unit 5, a behavior detection unit 7, a driver detection unit 9, a map storage unit 11, a positioning unit 13, a navigation device 15, a characteristic storage unit 17, and a head-up display (hereinafter, HUD) device 19. The map storage unit 11 is also referred to as a map storage, and the characteristic storage unit 17 is also referred to as a characteristic storage.

Each unit constituting the information display system 1 may transmit and receive information via an in-vehicle LAN. LAN is an abbreviation for Local Area Network.

As shown in FIG. 2, in the information display system 1, the HUD device 19 projects an image onto a projection area 23 of a windshield 21 located in front of the driver's seat, so that the information display system 1 displays various information through the windshield 21 by superimposing an actual scenery that is visually recognized by the driver. The projection area 23 is also referred to as a display unit. In the following, an image superimposed on such an actual scenery is referred to as an AR image. AR is an abbreviation for Augmented Reality. That is, here, as the HUD device 19, a head-up display (that is, AR-HUD) device having the above-mentioned AR function is used.

As shown in FIG. 1, the peripheral monitoring unit 5 includes at least one of a radar sensor and a camera. The radar sensor uses infrared rays, millimeter waves, ultrasonic waves, or the like as radar waves, and detects distance from a target that reflects the radar wave, direction in which the target exists, and the like. As the camera, a visible light camera, an infrared camera, or the like is used. The camera is arranged so as to include a region (hereinafter referred to as a visible region) visually recognized by the driver through the windshield 21 as an imaging range. Similar to the camera, the radar sensor is arranged so as to include the visible region as the detection range.

The peripheral monitoring unit 5 detects a target existing on the traveling path of the vehicle (for example, the subject vehicle) 2 with a radar sensor and a camera, and generates target information including the position of the detected target. The detection target of the peripheral monitoring unit 5 includes, for example, various targets to be processed by the advanced driver assistance system (that is, ADAS). ADAS is an abbreviation for advanced driver assistance system. The peripheral monitoring unit 5 may generate the target information including the position of the target based on the map information stored in the map storage unit 11 described later.

The behavior detection unit 7 outputs various signals indicating a driving operation by the driver, a signal indicating the behavior of the vehicle 2 as a result of the driving operation, and a signal indicating the state of the vehicle 2 affecting the behavior of the vehicle 2. Includes sensor.

For example, the behavior detection unit 7 includes a vehicle speed sensor 31, an acceleration sensor 33, sensors 35 for detecting output torque, a height sensor 37, and the like.

The vehicle speed sensor 31 is a sensor that detects a speed of the vehicle 2.

The acceleration sensor 33 is a sensor that detects the front-rear acceleration of the vehicle 2.

The sensors 35 have various sensors for detecting various signals for calculating the output torque of the tire (that is, the tire output). Examples of the sensors 35 include, for a case of the vehicle 2 driven by an internal combustion engine (that is, an engine), various sensors that detect the amount of fuel, the amount of air, and the like supplied to the engine. The output torque of the engine, and therefore the output torque of the tire, can be calculated from the sensor value output from each sensor.

Further, examples of the sensors 35 include, for a case of the vehicle 2 driven by electricity, various sensors that detects the voltage and current of electricity supplied to the motor for driving the tire. Then, the output torque of the tire can be calculated from the sensor value output from each sensor.

The height sensor 37 is provided on any of the wheels (for example, front wheel or rear wheel) of the vehicle 2 and outputs a detection signal according to the relative displacement amount (hereinafter, vehicle height detection value) H between the axle of the wheel and the vehicle body. That is, the height sensor 37 is a change amount detection unit that detects the change amount of the vehicle height. The vehicle height detection value H includes the displacement amount of the suspension. In this embodiment, the height sensor 37 is provided, for example, on the right rear wheel.

In addition to the sensors 33 to 37, the behavior detection unit 7 may include, for example, an accelerator pedal sensor, a brake pedal sensor, a steering angle sensor, a direction indicator switch, a yaw rate sensor, and the like.

The driver detection unit 9 is a device that detects a driver's state such as a face position, a face direction, an eye position, and a line-of-sight direction based on a driver's face image captured by an in-vehicle camera. Based on the signal from the driver detection unit 9, it is possible to acquire position information (that is, eye information) indicating the positions of the eye in the vertical direction and the front-rear direction, as will be described later. The driver detection unit 9 is known as a so-called driver status monitoring (that is, DSM) system.

Map information, AR information, and the like are stored in the map storage unit 11. The map information is used for route guidance by the navigation device 15 and for superimposing an AR image on an actual scenery.

The map information includes, for example, information on roads, information on lane markings such as white lines and road markings, and information on structures. The information on the roads includes shape information such as position information for each point, curve curvature and slope, and connection relationship with other roads. The information on the lane markings and road markings includes, for example, type information of lane markings and road markings, location information, and three-dimensional shape information. The information on the structures includes, for example, type information, position information, and shape information of each structure. Here, the structure includes, for example, road signs, traffic lights, street lights, tunnels, overpasses, buildings facing the road, and the like.

The map information includes the above-mentioned position information and shape information in the form of point group data, vector data, or the like of feature points represented by three-dimensional coordinates. That is, the map information represents a three-dimensional map including altitude in addition to latitude and longitude with respect to the position information. Therefore, from the map information, it is possible to extract information on the slope of the road at each point on the road, specifically, a longitudinal slope along the traveling direction of the road and a cross slope along the width direction of the road. The location information included in the map information has a relatively small error on the order of centimeters. The map information is highly accurate map data in that it has position information based on three-dimensional coordinates including height information, and it is also highly accurate map data in that the error in the position information is relatively small.

The AR information is data used for displaying an AR image, and includes symbols, characters, icons, and the like that are superimposed and displayed on the background (that is, the actual scenery). The AR information may include information for route guidance linked with the navigation device 15 (for example, an arrow superimposed on the road surface).

The positioning unit 13 is a device that generates position information for identifying the current position of the vehicle (for example, the subject vehicle) 2. The positioning unit 13 includes, for example, a GNSS receiver and sensors for autonomous navigation such as a gyroscope and a distance sensor. The GNSS stands for Global Navigation Satellite System. The GNSS receiver receives a transmission signal from the artificial satellite and detects the position coordinates and altitude of the subject vehicle 2. The gyroscope outputs a detection signal according to the angular velocity of the rotational motion applied to the subject vehicle 2. The distance sensor outputs the mileage of the subject vehicle 2.

The positioning unit 13 calculates the current position of the subject vehicle 2 based on the output signals from these devices. The positioning unit 13 generates highly accurate position information and the like of the subject vehicle 2 by combined positioning that combines the information from the GNSS receiver and the information from the sensor for autonomous navigation. The positioning unit 13 has the accuracy of identifying the lane in which the subject vehicle 2 travels among the plurality of lanes, for example.

The navigation device 15 provides route guidance based on the current position of the subject vehicle 2 and the map data. The navigation device 15 identifies the current position and the traveling direction of the subject vehicle 2 on the road by the positioning result of the positioning unit 13 and the map matching using the map data. The navigation device 15 provides the display control device 3 with the map information, AR information, and the like regarding the current position and traveling direction of the subject vehicle 2, the route to the destination, the roads and facilities existing in the visual area of the driver, and the like.

The characteristic storage unit 17 includes a non-volatile memory. The characteristic storage unit 17 stores a vehicle characteristic value (that is, characteristic information) G used at the time of conversion from the detection value (that is, the vehicle height detection value) H of the height sensor 37 to a vehicle pitch angle $\theta$. The vehicle pitch angle $\theta$ is an inclination angle of the vehicle body in the front-rear direction with respect to the horizontal plane.

Figure 3:
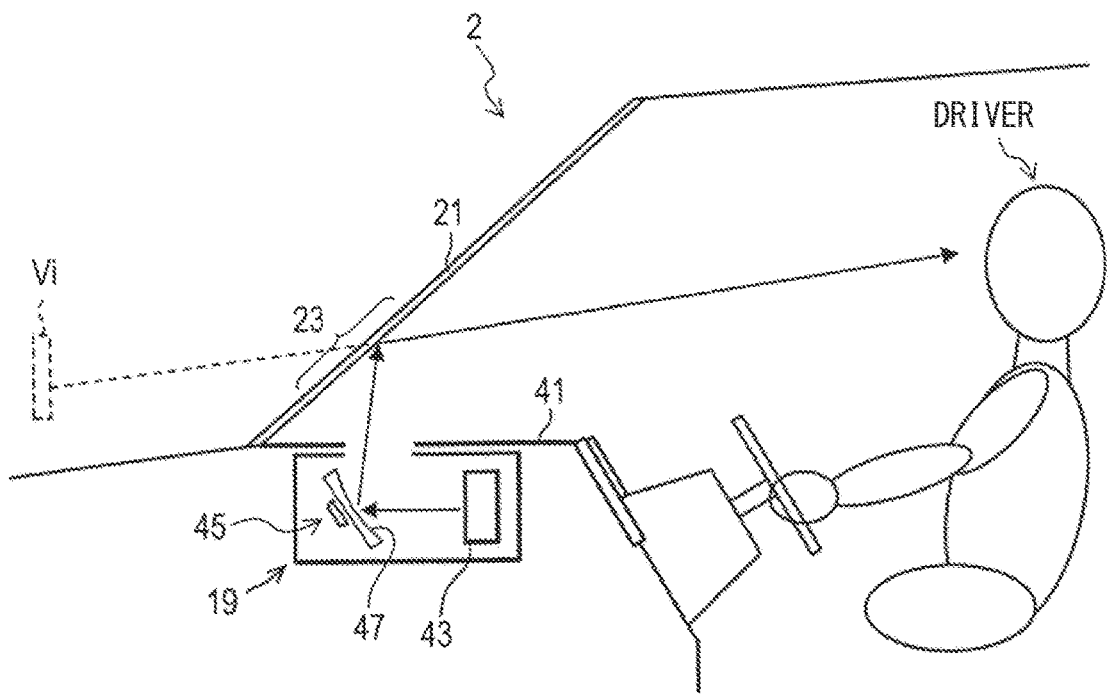
FIG. 3 is an explanatory diagram showing an arrangement and the like of a HUD device.

As shown in FIGS. 2 and 3, the HUD device 19 is arranged in the instrument panel 41. The HUD device 19 includes a projector 43 and an optical system 45. The projector 43 includes a liquid crystal display (hereinafter referred to as LCD) panel and a backlight. The projector 43 is fixed in a position at which the display screen of the LCD panel is directed toward the optical system 45. The projector 43 displays an image on the LCD panel according to an instruction from the display control device 3, transmits light by a backlight, and emits light formed as a virtual image toward the optical system 45.

The optical system 45 has at least a mirror 47 (for example, a concave mirror), and projects onto a certain projection area 23 by reflecting and magnifying the light emitted from the projector 43 in a region on the windshield 21 set in the driver's viewing region. As a result, the AR image as shown by Vi in FIG. 3 is superimposed and displayed on the actual scenery in the visible area of the driver.

[1-2. Display Control Device]

Next, the display control device 3 will be described in detail.

As shown in FIG. 1, the display control device 3 includes a microcomputer 50 having a CPU 51 and, for example, a semiconductor memory 53 such as a RAM 53a, a ROM 53b, and a flash memory 53c. Each function of the display control device 3 is realized by the CPU 51 executing a program stored in a non-transitional tangible recording medium (for example, a semiconductor memory 53). The display control device 3 is also called an HCU. HCU is an abbreviation for HMI Control Unit, and HMI is an abbreviation for Human Machine Interface.

Figure 4:
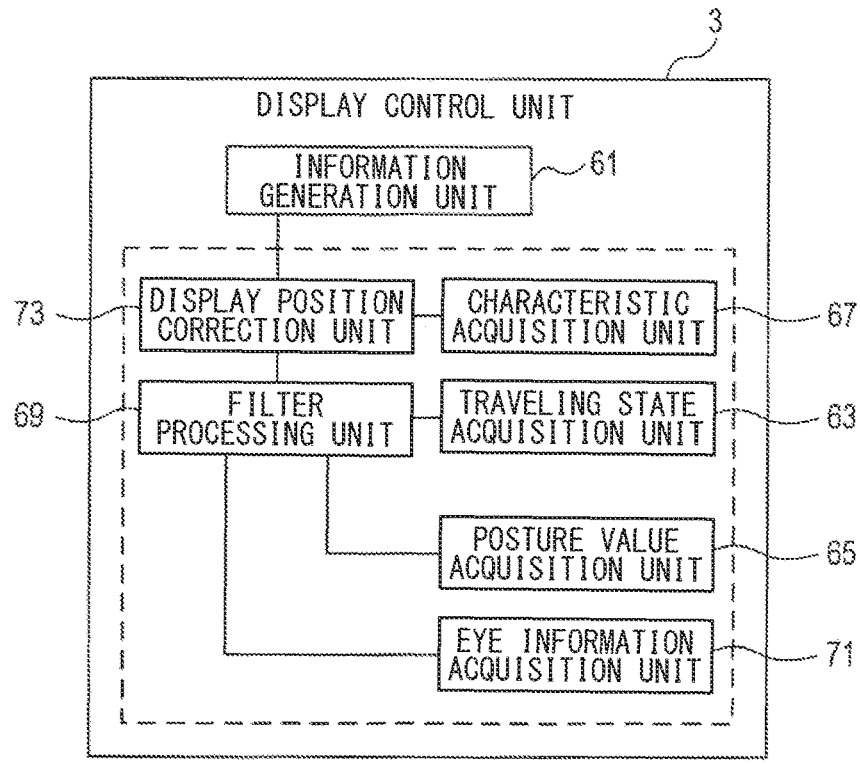
FIG. 4 is a block diagram functionally showing a configuration of a display control device.

As shown in FIG. 4, the microcomputer 50 of the display control device 3 includes, as functional configurations realized by executing a program stored in the semiconductor memory 53, an information generation unit 61, a traveling state acquisition unit 63, a posture value acquisition unit 65, a characteristic acquisition unit 67, a filter processing unit 69, an eye information acquisition unit 71, and a display position correction unit 73.

The information generation unit 61 sets the display position (that is, the projection position) in the projection area 23 of the windshield 21 such that the AR image to be recognized as the virtual image to the driver is superimposed on the scenery. The projection area 23 is disposed in front of the driver seat of the vehicle 2 and enables the driver to recognize the scenery in front of the vehicle 2.

Specifically, the information generation unit 61 defines the region in the windshield 21 of the vehicle 2 on which the AR image to be recognized as the virtual image by the driver is projected as the projection region 23. Further, through the projection area 23, information on an object (for example, a road) existing in the scenery visible to the driver is acquired. Then, the projection position in the projection area 23 of the superimposed image (that is, the AR image) superimposed on the object is set according to the three-dimensional position information of the object.

The traveling state acquisition unit 63 is configured to acquire the traveling state of the vehicle 2. The traveling state acquisition unit 63 detects the traveling state of the vehicle 2 based on the signals from the vehicle speed sensor 31, the acceleration sensor 33, and the sensors 35 for detecting the output torque in the behavior detection unit 7. That is, the traveling state acquisition unit 63 is capable of determining whether the traveling state of the vehicle 2 is a stopped state, a constant speed traveling state, or an acceleration state.

For example, when determining that the vehicle speed is 0 or 4 m/s or less based on the signal from the vehicle speed sensor 31, the traveling state acquisition unit 63 determines that the vehicle is in the stopped state. Further, when determining that the change in vehicle speed within a predetermined time is within a predetermined value based on the signal from the vehicle speed sensor 31, the traveling state acquisition unit 63 determines that the vehicle is in the constant speed traveling state.

Further, when determining, based on the signal from the vehicle speed sensor 31, that the absolute value of the change in vehicle speed within a predetermined time is equal to or greater than a predetermined determination value, the traveling state acquisition unit 63 determines that the vehicle is in the acceleration state. Further, when determining that the absolute value of the front-rear acceleration of the vehicle 2 is equal to or higher than a predetermined determination value based on the signal from the acceleration sensor 33, the traveling state acquisition unit 63 determines that the vehicle is in the acceleration state. Further, when the output torque is calculated based on the signal from the sensor 35 for detecting the output torque and the absolute value of the change in the output torque is determined to be equal to or higher than a predetermined determination value, the traveling state acquisition unit 63 determines that the vehicle is in the acceleration state. The values of the respective determination values are different.

Here, the acceleration state includes both a case of having a positive acceleration and a case of having a negative acceleration (that is, a case of a deceleration state).

The posture value acquisition unit 65 is configured to acquire a vehicle posture value indicating the posture of the vehicle 2. In the present embodiment, as the vehicle posture value, a signal (that is, vehicle height detection value H) indicating the height (that is, vehicle height) of the vehicle 2 obtained from the height sensor 37 is used.

That is, the posture value acquisition unit 65 acquires the vehicle height detection value H, specifically, the displacement amount of the suspension, based on the signal from the height sensor 37.

The characteristic acquisition unit 67 is configured to acquire the vehicle characteristic value G indicating the characteristics of the vehicle 2 from the characteristic storage unit 17 that stores the vehicle characteristic value G. The vehicle characteristic value G is a characteristic value used when calculating the vehicle pitch angle θ, as will be described later. Examples of the vehicle characteristic value G include the wheelbase, the distance from the front wheel to the position of the center of gravity of the load applied to the vehicle 2, the spring constants of the front and rear suspensions, and the like.

The filter processing unit 69 is configured to filter a signal indicating the vehicle posture value (that is, the vehicle height detection value H) and a signal indicating the eye information.

In the present embodiment, as the filter used for the filter processing, for example, a well-known moving average filter represented by the following formula (1) is used.

(Equation 1)

$$y[i] = \frac{\sum_{n=0}^{L-1} x[i-n]}{L} = \sum_{n=0}^{L-1}\left\{\frac{1}{L} \cdot x[i-n]\right\} \tag{1}$$

In formula (1), y [i] represents the output at the time point i, x [i-n] represents the input at the time point i-n, and i and n represent positive integers. L represents the number of samples and corresponds to the time constant.

Figure 5:
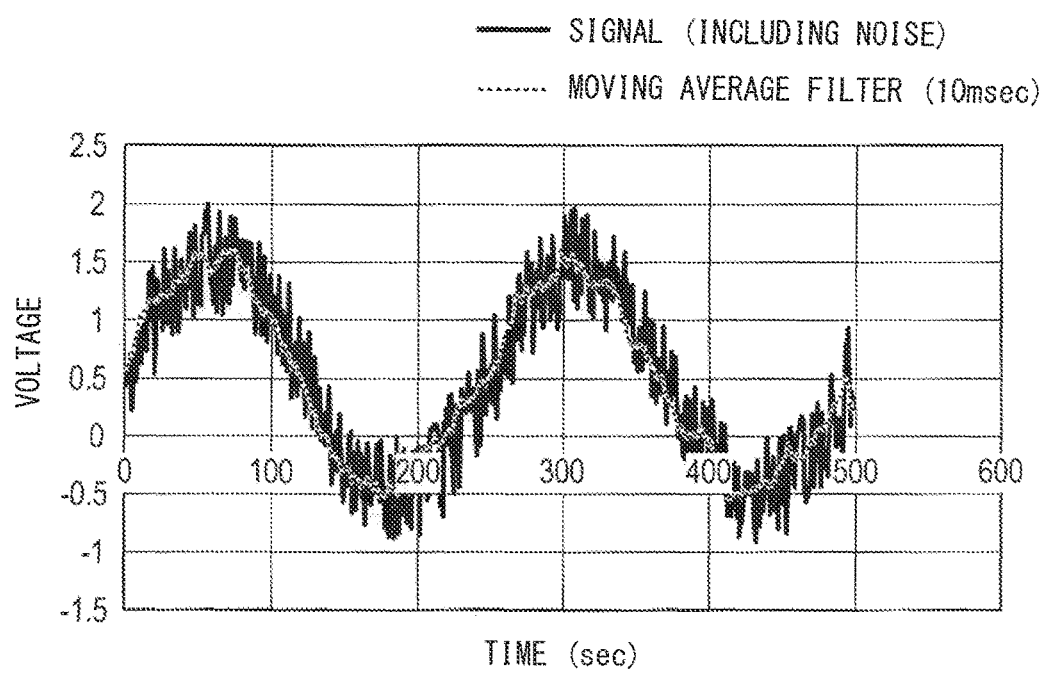
FIG. 5 is an explanatory diagram showing a change in a voltage signal when a moving average filter is used.

By using this moving average filter, for example, as shown in FIG. 5, the high frequency component of the sensor signal of the voltage, which is an input value, is suppressed, and an output value with reduced responsiveness can be obtained. Note that 10 msec indicates a period in which the moving average is taken.

In this embodiment, as will be described later, filters having different time constants depending on the traveling states are used. Further, the time constant of the filter used when performing the filter processing on the vehicle posture value (that is, the vehicle height detection value H) and the time constant of the filter used when performing the filter processing on the eye information are different.

For example, in the stopped state, t01 is adopted as the time constant of the filter used for the filter processing of the vehicle posture value, and t02 is adopted as the time constant of the filter used for the filter processing of the eye information. For example, in the acceleration state, t11 is adopted as the time constant of the filter used for the filter processing of the vehicle posture value, and t12 is adopted as the time constant of the filter used for the filter processing of the eye information. For example, in the constant speed traveling state, t21 is adopted as the time constant of the filter used for the filter processing of the vehicle posture value, and t22 is adopted as the time constant of the filter used for the filter processing of the eye information.

At this time, the following relations (2) to (4) are established for each time constant.

$$t01 < t02 \tag{2}$$

$$t11 < t12 \tag{3}$$

$$t21 < t22 \tag{4}$$

That is, each time constant of the filter for the vehicle posture value is smaller than each time constant of the filter for the eye information. That is, since the change in the eyes is considered to be slower than the change in the vehicle posture value, the eye information is averaged over a longer period of time than the vehicle posture value.

Further, the following relation (5) also holds for each time constant.

$$(t01, t02) < (t21, t22) < (t11, t12) \tag{5}$$

That is, in the stopped state, the time constants of the filter used for filtering the vehicle posture value and the filter used for filtering the eye information are made the smallest and updated earliest compared with the constant speed traveling state and the acceleration state (that is, processed fastest). In the constant speed traveling state, each of the time constants is made larger (for example, slightly larger) than in the stopped state, and processing is performed over time (for example, slightly over time). In the acceleration state, each of the time constants is made the largest as compared with the case of the stopped state and the constant speed traveling state, and the processing takes the longest time.

In this way, the time constants of the filter used for the filter processing of the vehicle value are set larger in the order of the stopped state, the constant speed traveling state, and the acceleration state. Moreover, the time constants of the filter used for the filter processing of the eye information are also set larger in the order of the stopped state, the constant speed traveling state, and the acceleration state.

A well-known low-pass filter (that is, LPF) may be used instead of the moving average filter. In this case as well, the time constant of the LPF is changed according to the traveling state and the processing target in the same manner as the time constant is changed according to the traveling state and the processing target by the moving average filter.

The eye information acquisition unit 71 is configured to acquire the eye information (that is, eye position information) indicating the position of the driver's eyes. The eye information acquisition unit 71 acquires the positions of the eyes in the vertical direction and the front-rear direction based on the signal from the driver detection unit 9.

The driver's eye point has mechanical characteristics of a spring, a mass, and a damper when viewed from the vehicle seat, and the frequency characteristics thereof are different from the frequency characteristics of the vehicle posture value. Therefore, in the present embodiment, as described above, the signal indicating the eye information has different time constant from the time constant of the filter that processes the vehicle posture value, and is processed using each filter of t02, t12, t22 set according to the traveling state.

The display position correction unit 73 is configured to correct the display position of the AR image to be superimposed on the scenery in the projection area 23 in the windshield 21 based on the vehicle posture value processed by the filter processing unit 69 for the signal indicating the vehicle posture value acquired by the posture value acquisition unit 65 (that is, the processed vehicle posture value), the vehicle characteristic value G acquired by the characteristic acquisition unit 67, and the eye information processed by the filter processing unit 69 for the signal indicating the eye information acquired by the eye information acquisition unit 71 (that is, the processed eye information).

That is, when correcting the display position, a comprehensive correction amount is used. The comprehensive correction amount is a value taking into account a pitch correction amount according to the vehicle pitch angle θ, which is the correction amount calculated based on the vehicle posture value filtered according to the traveling state and the vehicle characteristic value G, and an eye correction amount calculated by the filtered eye information.

Then, based on this comprehensive correction amount, the projection position (that is, the reference projection position) of the AR image in the projection area 23 generated by the information generation unit 61 is corrected.

[1-3. Control processing] Next, the control processing performed by the display control device 3 will be described with reference to the flowchart of FIG. 6. This processing is executed when the power supply to the HUD device 19 is started and the HUD device 19 becomes a state where displaying is enabled.

<Overall Processing>

Figure 6:
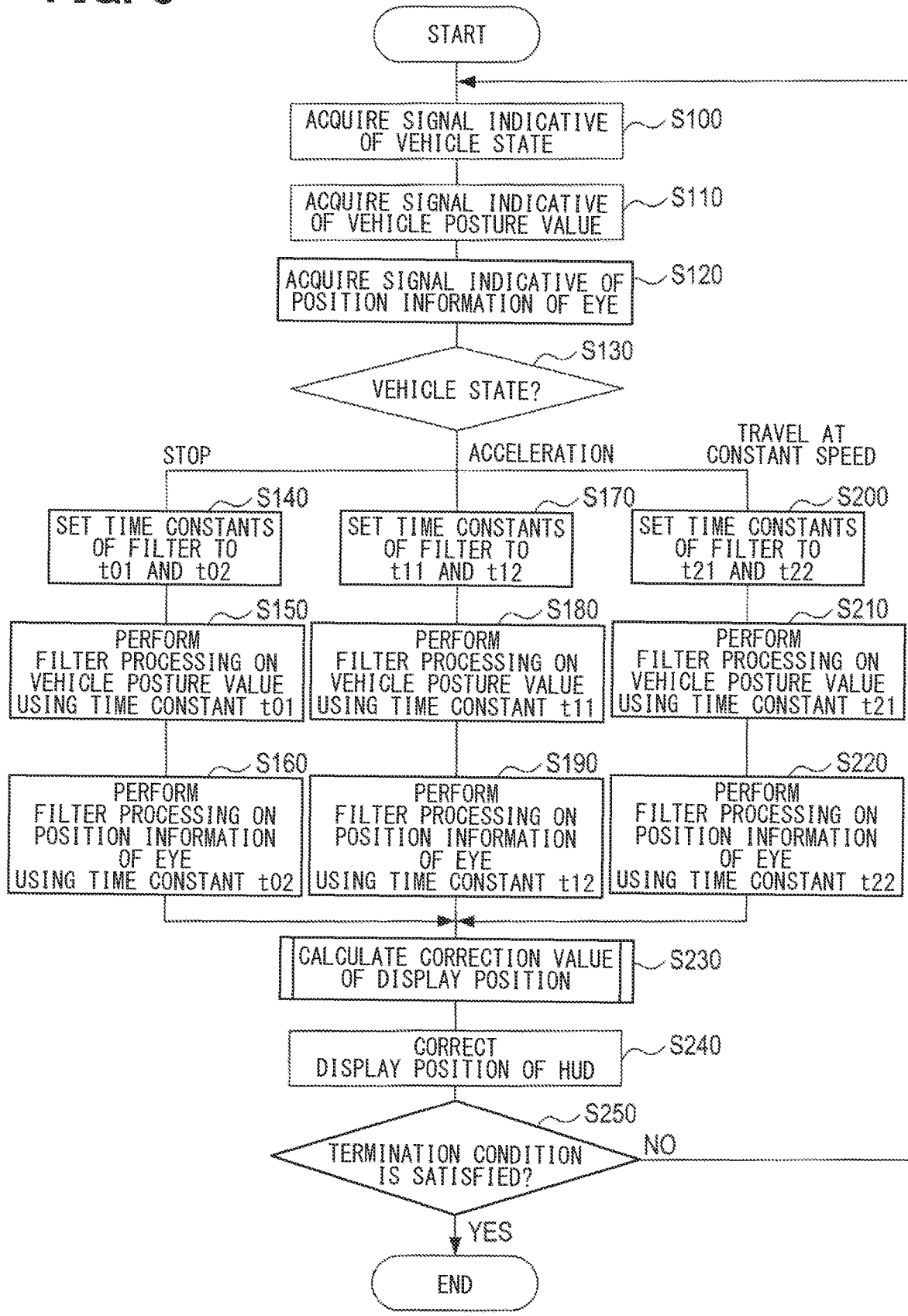
FIG. 6 is a flowchart showing a main processing executed by the display control device.

As shown in FIG. 6, in S100, the display control device 3 acquires signals from the vehicle speed sensor 31, the acceleration sensor 33, and the sensors 35 for detecting the output torque of the behavior detection unit 7. That is, signals indicating the traveling state (that is, a vehicle state) of the vehicle 2 such as a vehicle speed state and an acceleration state are acquired.

In the following S110, the signal from the height sensor 37 is acquired. Specifically, a signal indicating a vehicle height detection value H indicating a displacement amount of the suspension (that is, a signal indicating a vehicle posture value) is acquired.

In the following S120, the signal from the driver detection unit 9 is acquired. That is, a signal indicating the position information (that is, eye information) of the driver's eyes is acquired.

In the following S130, the vehicle state (that is, the traveling state) is determined. That is, as described above, the vehicle 2 is determined whether in the stopped state, the acceleration state, or the constant speed traveling state based on the signals from the vehicle speed sensor 31, the acceleration sensor 33, and the sensors 35.

Here, it is assumed that the acceleration state includes not only the case of having a positive acceleration but also the case of having a negative acceleration (that is, a deceleration state).

Here, when it is determined that the vehicle is in the stopped state, the process proceeds to S140, when it is determined that the vehicle is in the acceleration state, the process proceeds to S170, and when it is determined that the vehicle is in the constant speed traveling state, the process proceeds to S200. In other cases, for example, the process may return to S100.

Since it is determined that the vehicle is in the stopped state, in S140, the time constants of the moving average filter (that is, the filter) are set to t01 and t02 as described above are prepared. That is, filters with different time constants are prepared. In addition, t01<t02 is satisfied.

In the following S150, the filter processing using the filter having the time constant of t01 is performed on the signal indicating the vehicle posture value, specifically, the signal indicating the vehicle height detection value H acquired from the height sensor 37.

In the following S160, the filter processing using the filter having the time constant of t02 is performed on the signal indicating the eye information, and the process proceeds to S230.

On the other hand, since it is determined that the vehicle is in the acceleration state, in S170, the time constants of the filter are set to t11 and t12 as described above are prepared. That is, filters with different time constants are prepared. In addition, t11<t12 is satisfied.

In the following S180, the filter processing using the filter having the time constant of t11 is performed on the signal indicating the vehicle posture value, specifically, the signal indicating the vehicle height detection value H acquired from the height sensor 37.

In the following S190, the filter processing using the filter having the time constant of t12 is performed on the signal indicating the eye information, and the process proceeds to S230.

On the other hand, since it is determined that the vehicle is in the constant speed traveling state, in S200, the time constants of the filter are set to t21 and t22 as described above are prepared. That is, filters with different time constants are prepared. In addition, t21<t22 is satisfied.

In the following S210, the filter processing using the filter having the time constant of t21 is performed on the signal indicating the vehicle posture value, specifically, the signal indicating the vehicle height detection value H acquired from the height sensor 37.

In the following S220, the filter processing using the filter having the time constant of t22 is performed on the signal indicating the eye information, and the process proceeds to S230.

Note that t01, t02, t11, t12, t21, and t22 have the relationship of the above-mentioned formula (5).

In S230, the correction amount of the display position is calculated. The process of calculating the correction amount of the display position will be described in detail in the flowchart of FIG. 7 described later.

In the following S240, the display position of the HUD device 19 is corrected by using the correction amount.

That is, the AR image generated by the information generation unit 61 is supplied to the HUD device 19 after the projection position is corrected by the correction amount. Specifically, the projection position (that is, the reference projection position) of the AR image in the projection area 23 generated by the information generation unit 61 is corrected in accordance with the correction amount (that is, the comprehensive correction amount), and the projection of the AR image is performed based on the corrected projection position.

In the following S250, it is determined whether or not the termination condition for terminating the present processing is satisfied. When an affirmative determination is made, the present processing is terminated. When a negative determination is made, the process returns to S100. It should be noted that, for example, when the ignition switch is turned off or when a command to stop the operation of the HUD device 19 is input, it is determined that the termination condition is satisfied.

<Correction amount calculation processing>

Next, the calculation processing of the correction amount of the display position performed in S230 will be described in detail based on the flowchart of FIG. 7.

Figure 7:
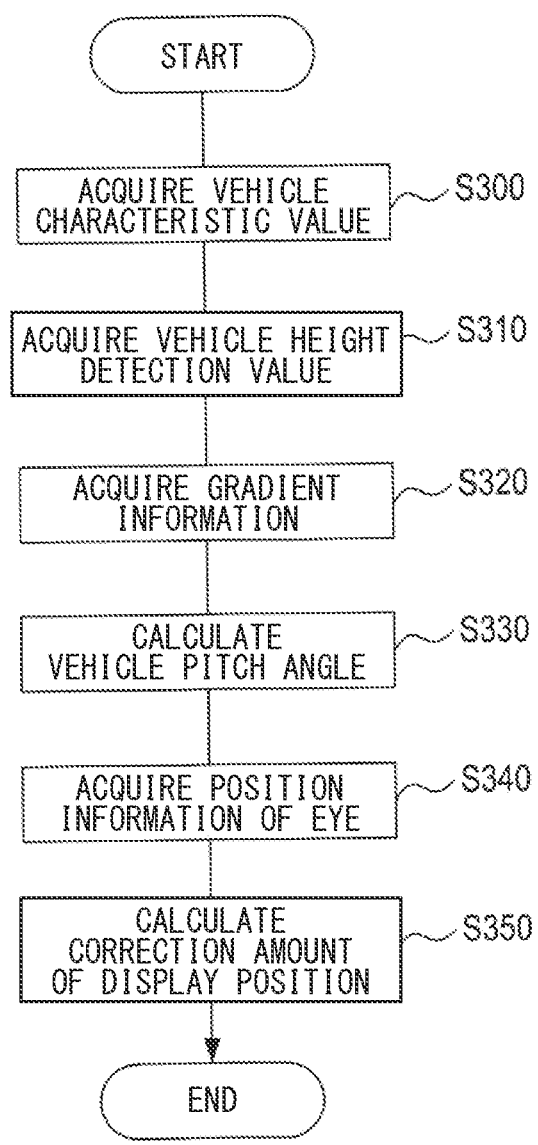
FIG. 7 is a flowchart showing a processing for calculating a correction amount of a display position executed by the display control device.

As shown in FIG. 7, in S300, the vehicle characteristic value G is acquired from the characteristic storage unit 17.

In the following S310, the signal of the height sensor 37 filtered in S150 (that is, the vehicle height detection value H) is acquired.

In the following S320, based on the map information stored in the map storage unit 11, the current position acquired from the positioning unit 13, that is, the gradient information ψ representing the road gradient of the road on which the subject vehicle 2 is traveling is acquired. The gradient information iv here represents a longitudinal gradient.

Next, in S330, the vehicle pitch angle θ, which is the inclination angle of the vehicle body in the front-rear direction with respect to the horizontal plane, is calculated using the following formula (6) based on the vehicle characteristic value G acquired in S300, the vehicle height detection value H acquired in S310 (that is, the vehicle height detection value H after filtering), and the gradient information ψ acquired in S320. Note that G (H) is a vehicle pitch angle estimated from the vehicle characteristic value G using the vehicle height detection value H. C is an experimentally determined constant.

$$\theta = G(H) + C \cdot \psi \tag{6}$$

In the following S340, the eye position information representing the eye position of the driver filtered in the S160 (that is, the eye information after the filter processing) is acquired. The eye position information is represented by, for example, the amount of deviation from the reference eye position. As will be described later, the amount of deviation of the position of the eye can be expressed by, for example, the angle of rotation of the eye from a reference point (for example, a superimposed object).

In the following S350, the correction amount of the projection position of the AR image in the projection area 23 is calculated based on the vehicle pitch angle θ calculated in S330, the eye position information (for example, the angle of rotation) acquired in S340, and the three-dimensional position of the object on which the AR image is superimposed (that is, the superimposed object).

That is, by adding the angle information of the eye (that is, the angle of rotation of the eye) indicated by the position information of the eye to the vehicle pitch angle θ, the rotation angle of the mirror 47 is corrected such that the AR image in the projection region is positioned on a straight line from the position of the eye to the object.

The eye angle information is information indicating the difference in angle between the position of the eye and the position of the object due to the position of the eye shifting in the vertical or front-rear direction, and is calculated from the positions of the eye and the object.

[1-4. Procedure for Calculating Amount of Correction]

Figure 8:
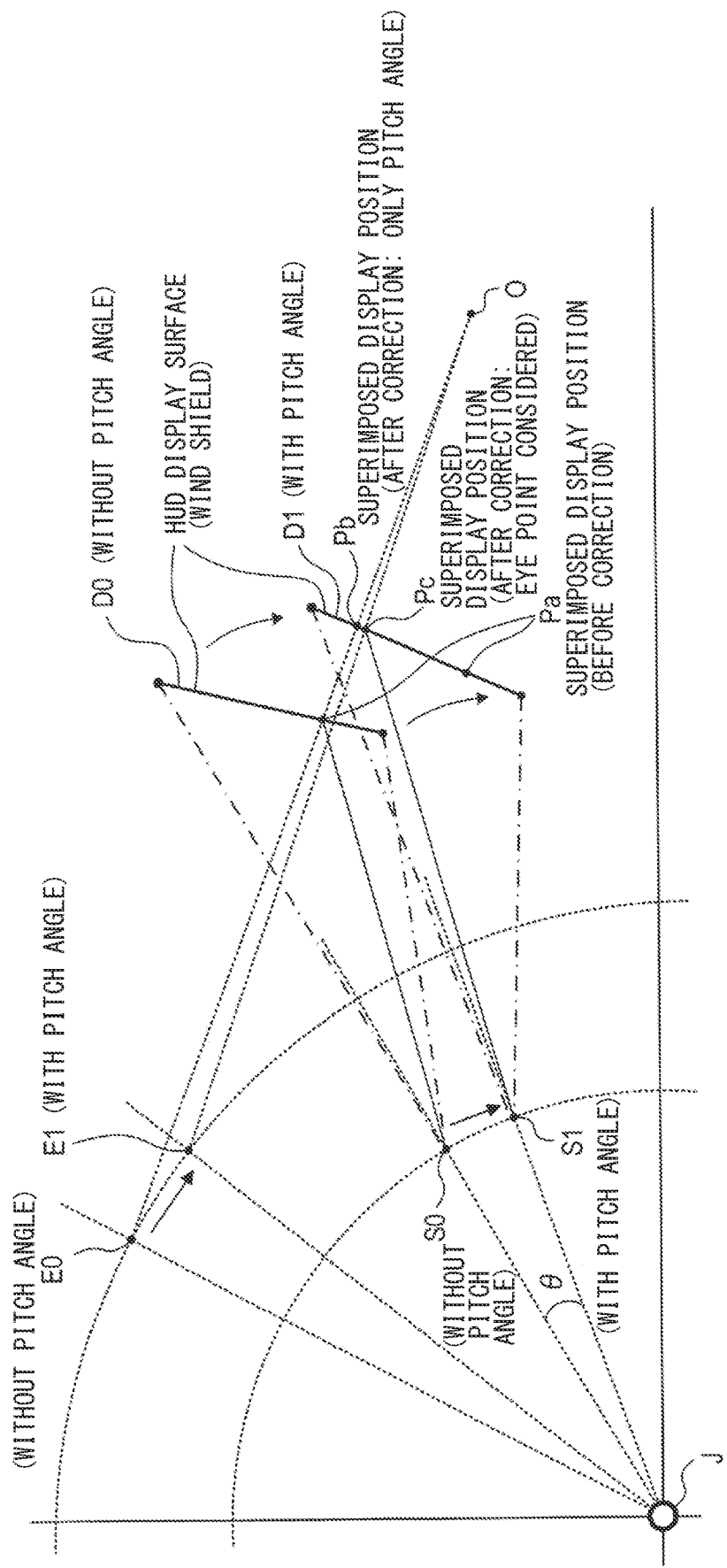
FIG. 8 is an explanatory diagram showing a relationship between a change in pitch angle and deviation of eye positions and superimposed display positions on a HUD display surface.

Next, the outline of the process for calculating the correction amount of the projection position of the AR image performed in FIG. 7 will be described with reference to FIG. 8.

Here, for the sake of simplification of the explanation, the case where the gradient information is ψ=0° will be described.

A case where the vehicle 2 causes pitching and the vehicle body tilts forward will be described. The eye position of the driver is represented by Ei, the projection area 23 is represented by Di, and the position where the light imaged as a virtual image is emitted, that is, the position of the projector 43 is represented by Si. Note that i=0 indicates a position when the vehicle pitch angle is 0°, and i=1 indicates a position when the vehicle pitch angle is θ.

When the vehicle 2 tilts forward due to pitching, the projection region D0 of the windshield 21, which is the display surface (that is, the HUD display surface) of the HUD device 19, and the light emission position S0 define the vehicle center of gravity J as the center of rotation and move to the positions D0 to D1 and S0 to S1, respectively, rotated by an angle θ (that is, the vehicle pitch angle θ).

The driver's eye position E0 indicates the position of the vehicle 2 leaning forward, and the driver's eye position E1 indicates the position when the vehicle 2 tilts forward at the vehicle pitch angle θ.

When the vehicle pitch angle is 0°, that is, when the eye position is at E0, the AR image superimposed on the object (that is, the superimposed object) O needs to be projected at the position Pa that intersects a straight line connecting the eye position E0 and the object O and the projection region D0.

When only the vehicle 2 is considered in a case where the vehicle pitch angle is θ, that is, when only the vehicle 2 is tilted and the eye position is at E0, the AR image superimposed on the object O needs to be projected at the position Pb that intersects a straight line connecting the eye position E0 and the object O and the projection area D1.

That is, the projection position Pb in the projection area D1 is a position shifted upward as compared with the projection position Pa in the projection area D0.

Further, when the vehicle 2 is tilted forward and the actual eye position is the eye position E1, the AR image superimposed on the object O needs to be projected on the position Pc in the projection area D1.

That is, the projection position Pc when the eye position is displaced is shifted downward as compared with the projected position Pb when the eye position is not displaced.

Figure 9:
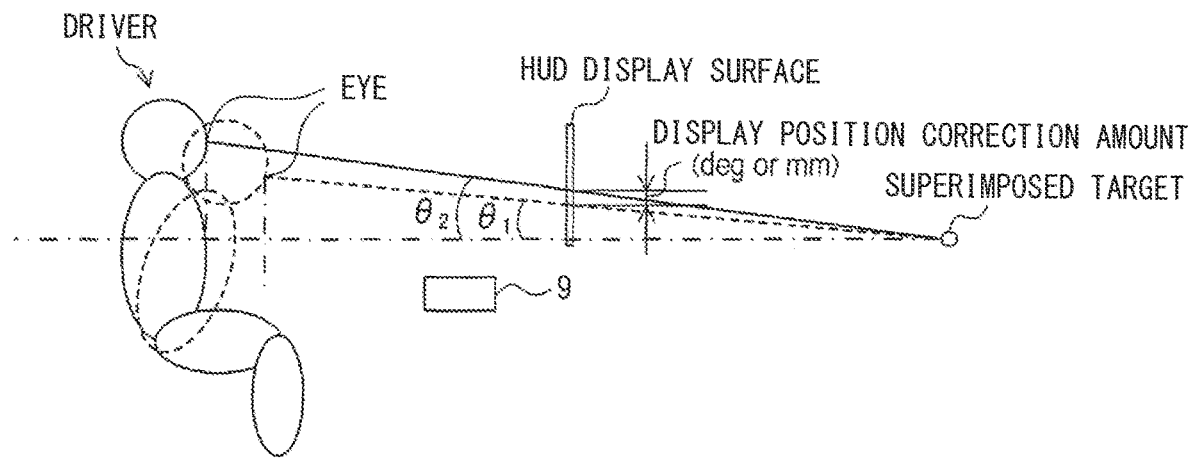
FIG. 9 is an explanatory diagram showing a relationship between the deviation of eye positions and superimposed display positions on the HUD display surface.

As shown in FIG. 9, since the position of the eye can be detected by the camera of the driver detection unit 9, it is possible to acquire each of the angles θ1 and θ2 that is an angle between the position of the object (for example, the horizontal position) and the position of the eye. Note that θ1 is the angle before rotation and θ2 is the angle after rotation. Therefore, the amount of movement (that is, the angle of rotation) when the eye moves from E0 to E1 can be acquired by θ2-θ1.

In this way, by summing the correction amount according to the vehicle pitch angle θ, that is, the deviation amount from Pa to Pb, and the correction amount caused by the deviation of the eye position, that is, the deviation amount from Pb to Pc (that is, θ2-θ1), the correction amount of the projection position of the AR image is calculated.

Here, the correction amount is indicated by an angle. Alternatively, the correction amount may be indicated by the correction amount of the position in the vertical direction of the LCD panel or the like or the position of the pixel, since the position in the LCD panel (for example, the distance in the vertical direction and the number of pixels), and therefore the position in the projection area 23 (for example, the distance in the vertical direction and the pixels) is corrected.

[1-5. Vehicle Characteristic Value]

Next, the vehicle characteristic value G stored in the characteristic storage unit 17 will be described.

Figure 10:
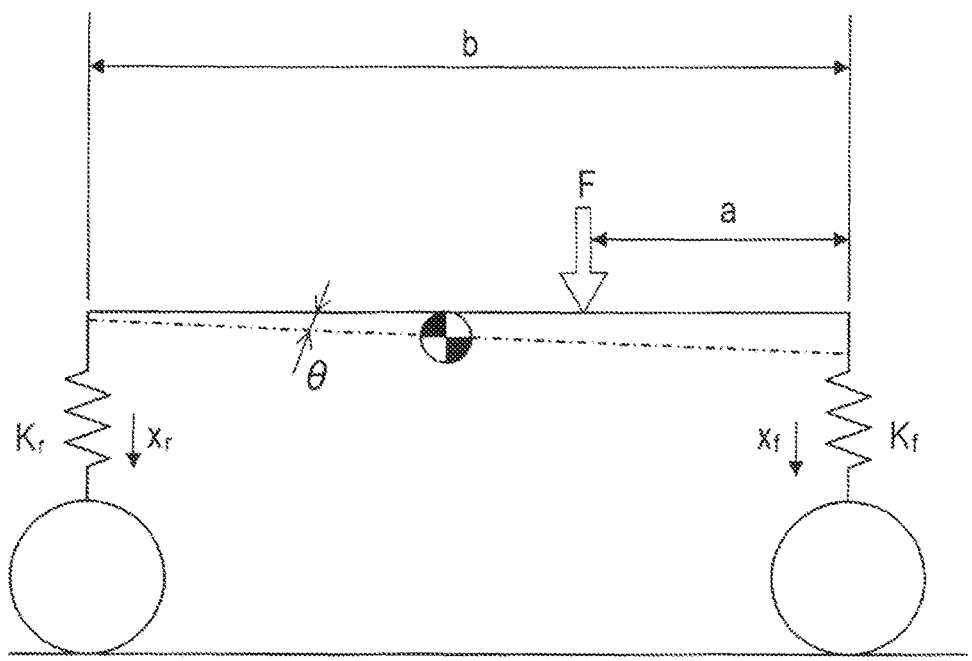
FIG. 10 is an explanatory diagram showing a simple model showing a relationship between a detection value of a height sensor and a vehicle pitch angle.

Using the simple two-wheel model shown in FIG. 10, the relationship between the detected value of the height sensor 37 and the vehicle pitch angle is theoretically derived. Here, the distance from the front wheel to the position of the center of gravity of the load applied to the vehicle 2 is defined as a, and the distance from the front wheel to the rear wheel is defined as b. The spring constant of the front suspension is defined as $K_f$, the spring constant of the rear suspension is defined as $K_r$, the displacement amount of the front suspension is defined as $x_f$, and the displacement amount of the rear suspension is defined as $x_r$. The load applied to the vehicle 2 is defined as F, and the vehicle pitch angle, which is the tilt angle of the vehicle body due to this load, is defined as θ.

Formula (7) is obtained from the balance of forces, and formula (8) is obtained from the balance of moments around the front.

(Equation 2)

$$F = K_f \cdot x_f + K_r \cdot x_r \quad (7)$$

$$a \cdot F - b \cdot x_r \cdot K_r = 0 \quad (8)$$

Solving formula (8) for xr gives formula (9), and substituting formula (9) into formula (7) for rearrangement gives formula (10).

(Equation 3)

$$x_r = \frac{a \cdot F}{b \cdot K_r} \quad (9)$$

$$x_f = \frac{F}{K_f}\left(1 - \frac{a}{b}\right) \quad (10)$$

At this time, the vehicle pitch angle θ is expressed by the formula (11), and by solving this with respect to θ, the formula (12) can be obtained.

(Equation 4)

$$\tan\theta = \frac{x_r - x_f}{b} \quad (11)$$

$$\theta = \tan^{-1}\frac{x_r - x_f}{b} \quad (12)$$

That is, when xf is obtained by the height sensor 37, F can be obtained from the formula (10), and xr is calculated from the formula (9) using F. Similarly, when xr is obtained by the height sensor 37, F can be obtained from the formula (9), and xf is calculated from the formula (10) using F.

The vehicle pitch angle θ can be obtained by using the values of xf and xr and the formula (12). From this relationship, it can be seen that there is a corresponding relationship between the detection value of the height sensor 37 (that is, xf or xr), that is, the vehicle height detection value H, and the vehicle pitch angle θ.

[1-6. Effects]

According to the present embodiment detailed above, the following effects may be obtained.

(1a) In the present embodiment, the characteristics of the filter used by the filter processing unit 69 are set according to the traveling state of the vehicle 2, and the display position when the AR image to be recognized as a virtual image is superimposed on the scenery in the projection area 23 of the windshield 21 is corrected based on the vehicle posture value (that is, the vehicle height detection value H) in which the filter process is performed using the set filter and the vehicle characteristic value G acquired by the characteristic acquisition unit 67.

According to such a configuration, when the display position of the AR image is corrected based on the vehicle posture value and the vehicle characteristic value, the vehicle posture value in which the filter process is performed using the filter set according to the traveling state of the vehicle 2. Thus, when the AR image is displayed, the configuration can suppress the flickering of the display and quickly correct the display position.

Specifically, when the vehicle 2 is in the acceleration state, a filter having a large time constant is adopted as compared with the case where the vehicle 2 is in the stopped state or the constant speed traveling state. Thus, the configuration, in the acceleration state, can suppress the flickering of the display, and, in the stopped state or the like, quickly correct the display position.

Since the time constant of the filter used in the constant speed traveling state is a value between the acceleration state and the stopped state, it is possible to be moderately consistent of reducing the flicker of the display and quickly correcting the display position.

Figure 11:
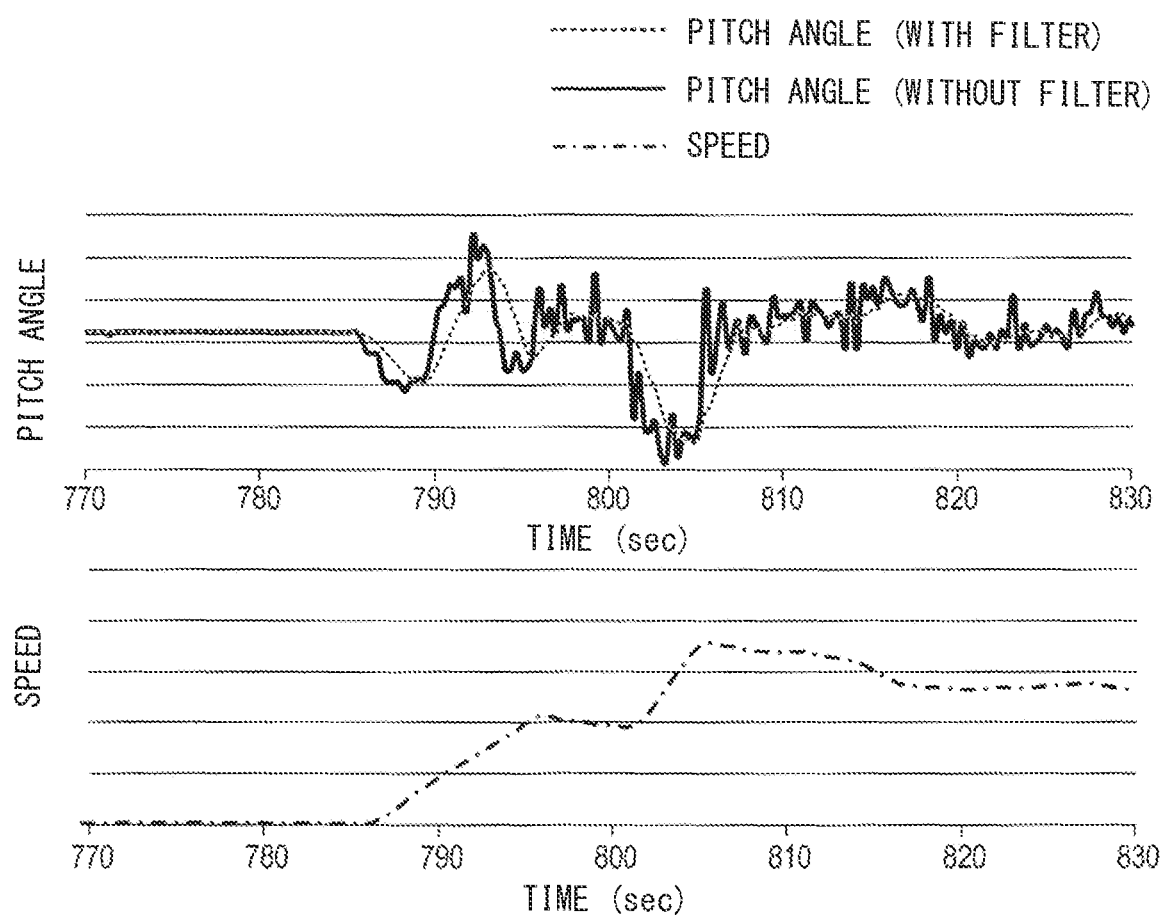
FIG. 11 is an explanatory diagram showing a relationship between a vehicle speed and a pitch angle.

For example, as shown in FIG. 11, as the vehicle speed increases, the vehicle pitch angle θ (that is, the pitch angle in the figure) frequently fluctuates and the amount of fluctuation in the pitch angle also increases. Therefore, the display position fluctuates frequently and the amount of fluctuation increases, which makes the driver feel flickering.

Therefore, in the present embodiment, since the characteristic (for example, time constant) of the filter used for the filter processing of the vehicle posture value is changed in the traveling state of the vehicle 2, the configuration can perform appropriate filtering processing according to the traveling state. In this way, by adopting a filter having appropriate characteristics according to the traveling state, the configuration can achieve both reduction of display flicker and quick correction of the display position.

(1b) Further, in the present embodiment, the filter for the eye information that processes the eye information is configured to have a characteristic different from the filter used for the vehicle posture value.

Specifically, the time constant of the filter that filters the eye information is set to be greater than the time constant of the filter that filters the vehicle posture value. Then, when the display position is corrected, this eye information is also taken into consideration in the correction.

As described above, by using the filter in which the time constant suitable for the change of the eye is set, there is an advantage that the flicker of the display is further suppressed.

[2. Other embodiments] Although the embodiments of the present disclosure have been described above, the present disclosure is not limited to the embodiments described above, and various modifications can be made to implement the present disclosure.

(2a) In the present disclosure, the time constant of the filter used when the vehicle is stopped or when the vehicle is traveling at a constant speed may be smaller than the time constant of the filter used when the vehicle is accelerating.

(2b) In the present disclosure, the time constant of the filter used when the vehicle is stopped may be smaller than the time constant of the filter used when the vehicle is traveling at a constant speed.

(2c) In the present disclosure, the time constant for processing the eye information is greater than the time constant of the filter used for processing the vehicle posture value.

(2d) In the above embodiment, the time constant of the filter used for processing the eye information is set to be larger than the time constant of the filter used for processing the vehicle posture value. Alternatively, the time constant of the filter used for processing the eye information may be same as the time constant of the filter used for processing the vehicle posture value.

(2e) Further, only the time constant of the filter used for processing the vehicle posture value may be changed according to the traveling state.

That is, the filter used for processing the eye information is not limited, and may not be changed according to the traveling state, for example.

(2f) The display control device and the technique of the display device according to the present disclosure may be achieved by a dedicated computer provided by constituting a processor and a memory programmed to execute one or more functions embodied by a computer program.

Alternatively, the display control device and the technique of the display device according to the present disclosure may be achieved by a dedicated computer provided by constituting a processor with one or more dedicated hardware logic circuits.

Alternatively, the display control device and the technique of the display device according to the present disclosure may be achieved using one or more dedicated computers constituted by a combination of a processor and a memory programmed to execute one or more functions and a processor formed of one or more hardware logic circuits.

Further, the computer program may be stored in a computer-readable non-transitory tangible storage medium as instructions to be executed by a computer. The technique for realizing the functions of the respective units included in the display control device does not necessarily need to include software, and all of the functions may be realized with the use of one or multiple hardware.

(2g) The multiple functions of one component in the above embodiment may be realized by multiple components, or a function of one component may be realized by the multiple components. In addition, multiple functions of multiple components may be realized by one component, or a single function realized by multiple components may be realized by one component. A part of the configuration of the above embodiment may be omitted. At least a part of the configuration of the above embodiment may be added to or replaced with another configuration of the above embodiment.

(2h) The present disclosure can be realized in various forms, in addition to the display control device described above, such as a system including the display control device as a component, a program for causing a computer to function as the display control device, a non-transitory tangible storage medium such as a semiconductor memory storing the program, or a display control method.

What is claimed is:

1. A display control device comprising:
an information generation unit configured to set a display position of an image, as a virtual image, to be recognized by a driver of a vehicle such that the image is superimposed on a scenery in front of the vehicle, the image being displayed on a display unit that is disposed in front of a driver seat of the vehicle and enables the driver to recognize the scenery;
a traveling state acquisition unit configured to acquire a traveling state of the vehicle;
a posture value acquisition unit configured to acquire a vehicle posture value indicating a posture of the vehicle;
a characteristic acquisition unit configured to acquire a vehicle characteristic value indicating a characteristic of the vehicle from a characteristic storage unit that stores the vehicle characteristic value;
a filter processing unit configured to perform a filter processing with a filter on the vehicle posture value acquired by the posture value acquisition unit;
a display position correction unit configured to calculate a correction amount for correcting the display position at which the image is superimposed on the scenery based on the vehicle characteristic value processed by the filter processing unit and the vehicle characteristic value acquired by the characteristic acquisition unit; and
an eye information acquisition unit configured to acquire eye information indicating a position of an eye of the driver, wherein
the filter processing unit sets a characteristic of the filter according to the traveling state of the vehicle acquired by the traveling state acquisition unit, and performs the filter processing with the filter set,
a filter for processing the eye information has a characteristic different from the characteristic of the filter for the filter processing on the vehicle posture value, and the display position correction unit corrects the display position based on the eye information processed by the filter for the eye information.

2. The display control device according to claim 1, wherein
the traveling state acquisition unit acquires the traveling state of the vehicle based on a speed of the vehicle or a tire output.

3. The display control device according to claim 1, wherein
the posture value acquisition unit is arranged at least one of a front part and a rear part of the vehicle, and acquires the vehicle posture value based on a signal from a change amount detection unit configured to detect a change amount of a vehicle height.

4. A display control device comprising:
a processor configured to
set a display position of an image, as a virtual image, to be recognized by a driver of a vehicle such that the image is superimposed on a scenery in front of the vehicle, the image being displayed on a projection area that is disposed in front of a driver seat of the vehicle and through which the scenery is recognized;
acquire a traveling state of the vehicle;
acquire a vehicle posture value indicating a posture of the vehicle;
acquire a vehicle characteristic value indicating a characteristic of the vehicle from a characteristic storage that stores the vehicle characteristic value;
perform a filter processing with a filter on the vehicle posture value;
calculate a correction amount for correcting the display position at which the image is superimposed on the scenery based on the vehicle characteristic value after the filter processing and the vehicle characteristic value;
set a characteristic of the filter according to the traveling state in order to perform the filter processing with the filter set; and
acquire eye information indicating a position of an eye of the driver, wherein
a filter for processing the eye information has a characteristic different from the characteristic of the filter for the filter processing on the vehicle posture value, and
the processor corrects the display position based on the eye information processed by the filter for the eye information.

* * * * *